United States Patent Office 3,337,647
Patented Aug. 22, 1967

3,337,647
PROCESS FOR PREPARING 1,3-DIMETHYL-4-ISO-PROPYLBENZOL AND 1,3-DIMETHYL-4,6-DIISO-PROPYLBENZOL
Hans Binder, Frankfurt am Main, Herbert Mayr, Dormagen (Lower Rhine), Jozef Sulo, Frankfurt am Main, and Johannes Turowski, Castrop-Rauxel, Germany, assignors to Rutgerswerke und Teerverwertung Aktiengesellschaft, Frankfurt am Main, Germany
No Drawing. Filed May 3, 1965, Ser. No. 452,917
Claims priority, application Germany, May 6, 1964, R 37,849
10 Claims. (Cl. 260—671)

This invention relates to the preparation of 1,3-dimethyl-4-isopropylbenzol and 1,3-dimethyl-4,6-diisopropylbenzol.

It has been known to alkylate aromatic compounds with olefins by means of the Friedel-Crafts type catalysts. However, the Friedel-Crafts catalysts, particularly aluminum chloride, act also as catalysts of isomerization, polymerization, condensation, de-alkylation, splitting and dehydrogenation. From this it follows, that the use of Friedel-Crafts catalysts may cause many side reactions and a process must be carefully regulated if the desired product is supposed to be obtained in satisfactory yield. It is very difficult to steer the reaction to the formation of a specific compound, because in the alkylation all possible isomers are formed at the same time and the aluminum chloride may cause the occurrence of the above named reactions.

According to the U.S. Patent No. 2,740,819 to Kirkland, 1,3-dimethyl-1,4-isopropylbenzene is prepared with propene by means of partially hydratized $AlCl_3$. The same process is described in the Journal of Organic Chemistry, 1958, pp. 1631–35, by the same author and his collaborators in more detail. The alkylation conditions to be used are: alkylation temperature: 20 to 150° C.; 0.5–2 mol propene for 1 mol xylene; reaction time: preferably 1 to 5 hours; concentration of the $AlCl_3$ 0.0076 to 0.1 mol; addition of water 0.002 to 0.028 mol based on the m-xylene charged. This process renders possible also the preparation of 1,3-dimethyl-4,6-diisopropylbenzol, but the yields of these two compounds are not satisfactory.

It has now been found that the above mentioned compounds can be obtained with improved yields if a modified $AlCl_3$ catalyst is used, i.e. if as a co-catalyst a phenolformaldehyde-resin is used. It has been unexpectedly found that by the use of phenolformaldehyde resins as co-catalyst the reaction can be steered particularly easily to the formation of 1,3-dimethyl-4-isopropylbenzene and/or 1,3-dimethyl-4,6-diisopropylbenzene. The isomerization reactions are extensively suppressed and polymerization of propene is completely eliminated. No higher alkylated aromatic compounds than those desired, are formed.

The particular advantage of this invention consists in that the phenolformaldehyde resin can be applied in hardened condition to the walls of the reaction vessel, whereby not only a sufficiently large contact surface between reaction medium and the resin is attained, but, additionally, the use of inexpensive structural materials for the alkylation apparatus becomes possible, because the phenolformaldehyde resin is stable to aggression by $AlCl_3$ and provides protection from corrosion by the $AlCl_3$-complex-phase.

It is very well possible to apply the phenolformaldehyde resin also in powder form, instead of applying it to the walls of the reactor. However, such a procedure offers no advantages, because the resin must be filtered off after the end of the reaction and, of course, it does effect no protection from corrosion by the aggression of the $AlCl_3$-complex-phase.

As starting material for the preparation of 1,3-dimethyl-4-isopropylbenzene or 1,3-dimethyl-4,6-diisopropylbenzene, either m-xylene or technical xylene which consists in its bulk of m-xylene can be used. The concentration of $AlCl_3$ may be from 2–20 mol percent, based on the amount of the xylene charged. The amount of phenolformaldehyde resin can be varied in the range between 40 up to 1000% by weight based on the weight of $AlCl_3$. Propane is used in an amount of 0.4 up to 3 mol for 1 mol of xylene.

In preparing 1,3-dimethyl-4-isopropylbenzene and/or 1,3-dimethyl-4,6-diisopropylbenzene according to the present invention, 1 mol of xylene and 0.4 to 3 mol propene is alkylated in the presence of 0.02 to 0.2 anhydrous $AlCl_3$ at a temperature of from $-30$ to $+80°$ C. in the presence of 40–1000% by weight of a phenolformaldehyde resin (based on $AlCl_3$) during a reaction time of from 15 minutes to 6 hours at ordinary atmospheric pressure. After alkylation is terminated, the reaction mixture is mixed with water in order to decompose the $AlCl_3$-complex-phase and the residual $AlCl_3$. It is very well possible to separate the $AlCl_3$-complex-phase and the residual $AlCl_3$ prior to the decomposition and to use them for further alkylations. After washing the alkylate, the aqueous layer is separated, the alkylate is neutralized and dried and the desired 1,3-dimethyl-4-isopropylbenzene and/or the 1,3-dimethyl-4,6-diisopropylbenzene is recovered in a manner known per se by distillation and/or cooling.

The advantages of the present process are: efficient yield of 1,3-dimethyl-4-isopropylbenzene; the proportion of the isomers 1,3-dimethyl-4-isopropylbenzene and proportion of the isomers 1,3-dimethyl-4-isopropylbenzene to 1,3-dimethyl-5-isopropylbenzene in the isopropyl-xylene fraction can be increased in comparison to the process disclosed in the U.S. Patent No. 2,740,819. By applying the phenolformaldehyde resin to the reactor walls an excellent protection from corrosion by $AlCl_3$ can be secured and, therefore, inexpensive structural materials can be used for the apparatus.

The following examples illustrate some embodiments of the invention, to which the invention is not limited.

*Example 1*

A reactor of 30 liters, provided with means for stirring and cooling and the inner wall surfaces of which are provided with a layer of phenolformaldehyde resin, is charged with 10.6 kg. m-xylene and 670 g. of $AlCl_3$. During a reaction time of one hour, at a temperature of 30° C., alkylation is carried out with 4.1 kg. (2.14 Nm.³) of propene. After alkylation is terminated the alkylate is mixed with water and the hydrocarbon mixture is neutralized and subsequently separated from the aqueous phase formed, and dried. The gas-chromatographic analysis yields the following data:

| | Percent |
|---|---|
| m-Xylene | 24.6 |
| 1,3-dimethyl-4-isopropylenzene | 26.2 |
| 1,3-dimethyl-5-isopropylbenzene | 14.1 |
| 1,3-dimethyl-2-isopropylbenzene | 0.2 |
| 1,3-dimethyl-4,6-diisopropylbenzene | 29.0 |
| 1,3-dimethyl-5-diisopropylbenzene | 5.9 |
| 1,3-dimethyl-4,5-diisopropylbenzene | 5.9 |

The subsequent distillation yields the following results:

| | Product (kg.) |
|---|---|
| Xylene, boiling point 135–150° C. | 3.58 |
| Isopropylxylene, boiling point 190–207° C. | 5.85 |
| Diisopropylxylene | 4.3 |
| Residue and loss | 0.8 |

Rectification of the isopropylxylene fraction yields 3.8 kg. of 1,3-dimethyl-4-isopropylbenzene. The ratio between 1,3-dimethyl-4-isopropylbenzene and 1,3-dimethyl-5-isopropylbenzene corresponds to 65.1:34.9%.

*Example 2*

106 parts by weight of m-xylene is alkylated in the presence of 6.7 parts by weight of $AlCl_3$, at a temperature of 25–27° C. in a reaction vessel, the inner wall surfaces of which are provided with a layer of phenolformaldehyde resin, during a reaction time of 3 hours with 84 parts by weight of propene. After the reaction is terminated, the complex phase is hydrolyzed with water and the oil phase obtained is separated—after neutralization—from the aqueous phase, and dried. The gas-chromatographic analysis yields the following data:

|  | Percent |
|---|---|
| m-Xylene | 0.7 |
| 1,3-dimethyl-5-isopropylbenzene | 7.5 |
| 1,3-dimethyl-4-isopropylbenzene | 2.0 |
| 1,3-dimethyl-4,6-diisopropylbenzene | 78.6 |
| 1,3-dimethyl-2,5-diisopropylbenzene | 9.2 |
| 1,3-dimethyl-4,5-diisopropylbenzene | 1.4 |
| 1,3-dimethyl-2,4-diisopropylbenzene | 0.6 |

99.3% total alkylate are obtained, of which 89.8% are diisopropylxylene. The selectivity to 1,3-dimethyl-4,6-diisopropylbenzene amounts to 87.5%.

*Example 3*

106 parts by weight of m-xylene, 6.7 parts by weight of $AlCl_3$, 6 parts by weight of phenolformaldehyde resin in powder form, and 84 parts by weight of propene are alkylated at a temperature of 35° C. for two hours. After termination of the reaction, the complex phase is treated in the manner described in Example 2 and the phenolformaldehyde resin is filtered off. The resulting products contain:

|  | Percent |
|---|---|
| m-Xylene | 0.3 |
| 1,3-dimethyl-5-isopropylbenzene | 8.7 |
| 1,3-dimethyl-4-isopropylbenzene | 2.3 |
| 1,3-dimethyl-4,6-diisopropylbenzene | 74.3 |
| 1,3-dimethyl-2,5-diisopropylbenzene | 5.9 |
| 1,3-dimethyl-4,5-diisopropylbenzene | 7.5 |
| 1,3-dimethyl-2,4-diisopropylbenzene | 1.0 |

99.7% total alkylate are obtained, of which 88.7% is diisopropylxylene. The selectivity to 1,3-dimethyl-4,6-diisopropylbenzene amounts to 83.8%.

The parts and percentages stated herein are by weight if not otherwise stated.

It will be understood that this invention is not limited to the specific compounds, proportions, temperatures and other conditions specifically described herein and may be carried out with various modifications.

The phenolformaldehyde resins to be used as co-catalyst may be resols or novolaks, and they are prepared by condensation in the heat of e.g. 1 mol phenol or cresol and the like with 0.5 mol formaldehyde or its equivalents, in the presence of suitable catalysts in a manner well known from the art. For example, 40 parts phenol is heated with 35–75 parts aqueous formaldehyde of 30% in the presence of an alkaline catalyst, e.g. 1–10 parts, until a heat-hardenable resin having a melting point of 90° is formed. This resin can be molten and applied in molten condition to the walls of the apparatus in which the reaction is carried out. Or the solid resin is pulverized and the pulverized resin is intimately mixed with the reaction mass prior to or during the reaction. The phenolformaldehyde resin serving as a co-catalyst in alkylation according to the present invention is in the C condition and is a hardenable resin.

After termination of alkylation the reaction mass is mixed with 10 to 1000% by weight of water, in order to decompose the $AlCl_3$-complex-phase and the residual $AlCl_3$ and the alkylated product is washed with water. If the phenolformaldehyde resin is applied as a coating to the inner wall of the reactor, the reactor may consist of an inexpensive metal, for example iron. When the alkylation product is decomposed with water, and the aqueous layer formed is separated, the oily reaction product thus obtained is neutralized, for example with alkali-lye.

Technical xylene containing 40 to 60% m-xylene can be used.

What is claimed is:

1. A process for the catalytic alkylation of aromatic hydrocarbons by means of olefins in the presence of $AlCl_3$ as catalyst, comprising carrying out alkylation with the use of a phenolformaldehyde resin as co-catalyst.

2. A process for preparing a compound selected from the group consisting of 1,3-dimethyl-4-isopropylbenzene and 1,3-dimethyl-4,6-diisopropylbenzene, comprising catalytic alkylation in a reaction vessel of an aromatic hydrocarbon selected from the group consisting of m-xylene and technical xylene, the bulk of which consists of m-xylene, with propene, using as catalyst anhydrous $AlCl_3$ and as co-catalyst a phenolformaldehyde resin, using in the reaction for one mol xylene 0.4–3 mol propene in the presence of 0.02–0.2 mol anhydrous $AlCl_3$ and in the presence of 40–1000% by weight of phenolformaldehyde resin, based on the weight of the $AlCl_3$, the reaction being carried out at a temperature between −30 and +80° C., mixing the reaction mass after the alkylation with water in order to decompose the $AlCl_3$-complex-phase and the residual $AlCl_3$.

3. A process as claimed in claim 2, in which the layer formed by decomposition is separated from the reaction mass and the latter dried.

4. A process as claimed in claim 2, in which the $AlCl_3$-complex-phase and the residual $AlCl_3$ are separated from the reaction mass and used for further alkylation.

5. A process as claimed in claim 2, in which the reaction is carried out under ordinary atmospheric pressure.

6. A process as claimed in claim 3, in which the dried reaction mixture is subjected to fractional distillation.

7. A process as claimed in claim 2, in which the phenolformaldehyde resin catalyst is applied to inner surfaces of the reaction vessel.

8. A process as claimed in claim 2, in which the co-catalyst is a heat-hardenable, meltable phenolformaldehyde resin.

9. A process as claimed in claim 2, in which the co-catalyst is a heat-hardened, non-meltable phenolformaldehyde resin.

10. A process as claimed in claim 2, in which the co-catalyst is a phenolformaldehyde novolak.

References Cited

UNITED STATES PATENTS

| 2,406,896 | 9/1946 | Upham | 260—671 XR |
| 2,802,884 | 8/1957 | D'Alelio | 260—671 XR |
| 2,843,642 | 7/1958 | Kelly | 260—671 XR |

DELBERT E. GANTZ, *Primary Examiner.*

C. R. DAVIS, *Assistant Examiner.*